(No Model.)  5 Sheets—Sheet 3.

N. W. HOLT.
SEPARATING MACHINE.

No. 422,942. Patented Mar. 11, 1890.

Witnesses:  
Inventor:

(No Model.) 5 Sheets—Sheet 4.

N. W. HOLT.
SEPARATING MACHINE.

No. 422,942. Patented Mar. 11, 1890.

Witnesses:
J. C. Turner
B. W. Sommers

Inventor:
Noah W. Holt
by Doubleday & Blizealty (No Model.) 5 Sheets—Sheet 5.
N. W. HOLT.
SEPARATING MACHINE.
No. 422,942. Patented Mar. 11, 1890.
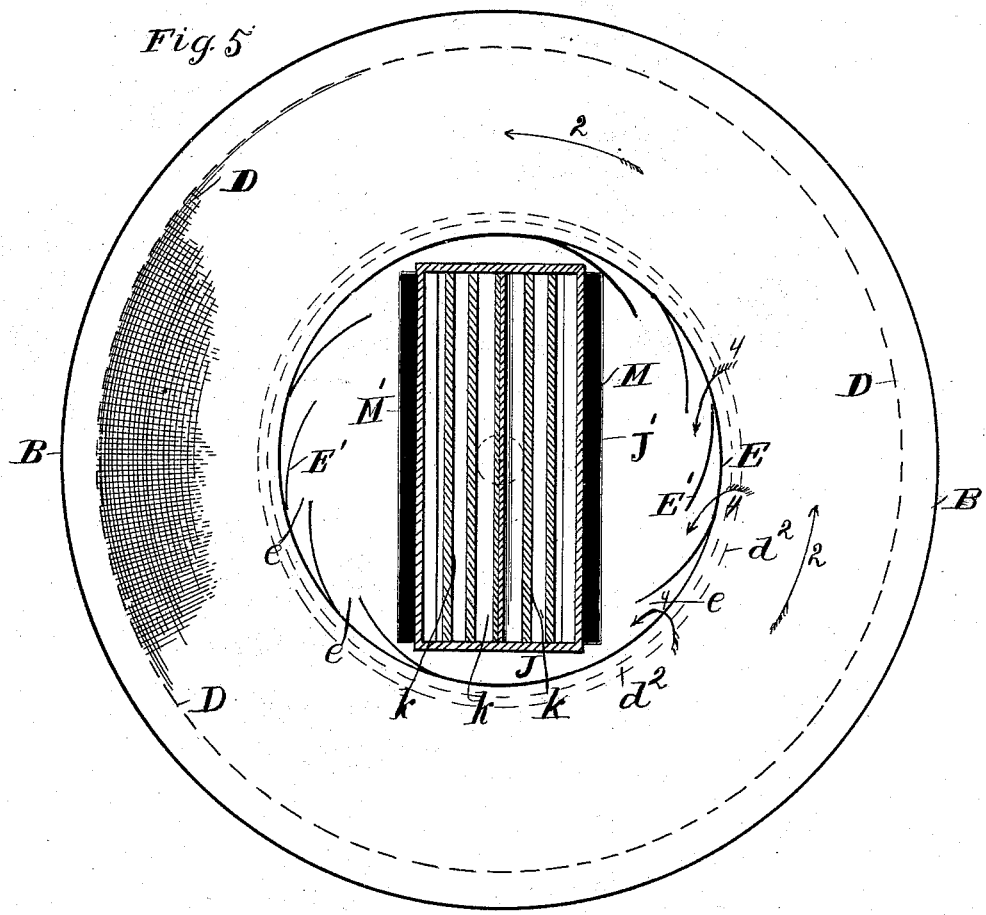
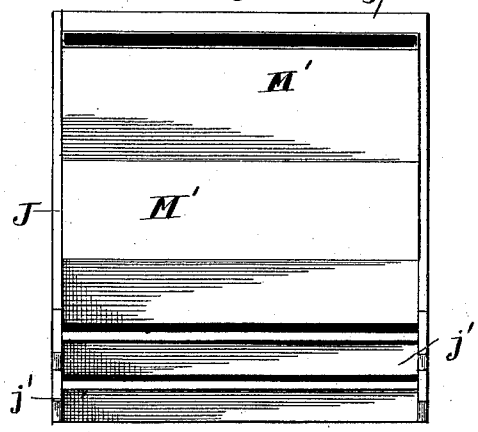
Witnesses:
J. C. Turner
B. W. Sommers
Inventor:
Noah W. Holt
by Dunkleday & Kirsch

UNITED STATES PATENT OFFICE.

NOAH WILLIAM HOLT, OF MANCHESTER, MICHIGAN.

SEPARATING-MACHINE.

SPECIFICATION forming part of Letters Patent No. 422,942, dated March 11, 1890.

Application filed July 5, 1888. Renewed February 12, 1890. Serial No. 340,214. (No model.)

*To all whom it may concern:*

Figure 1:
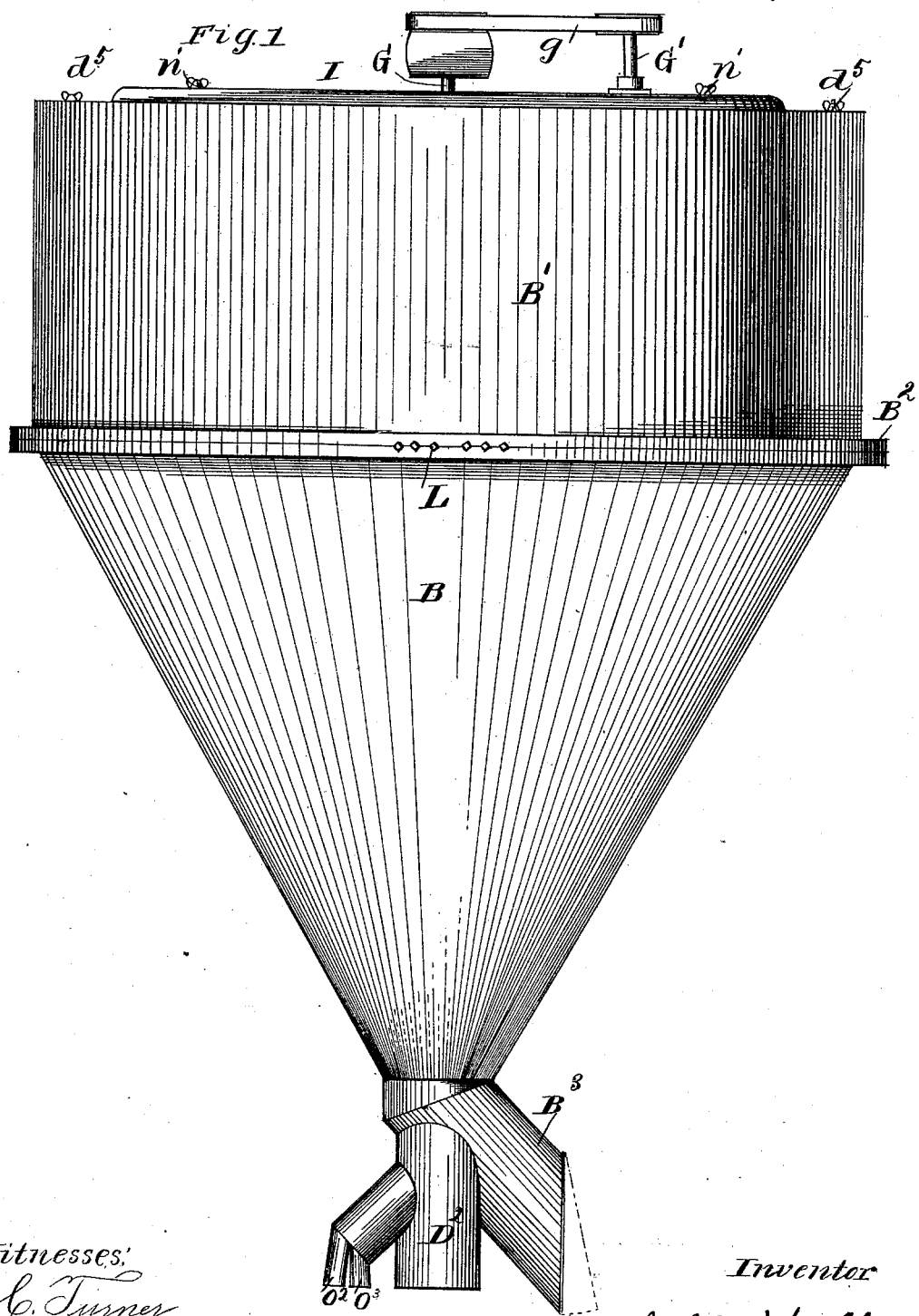
Figure 2:
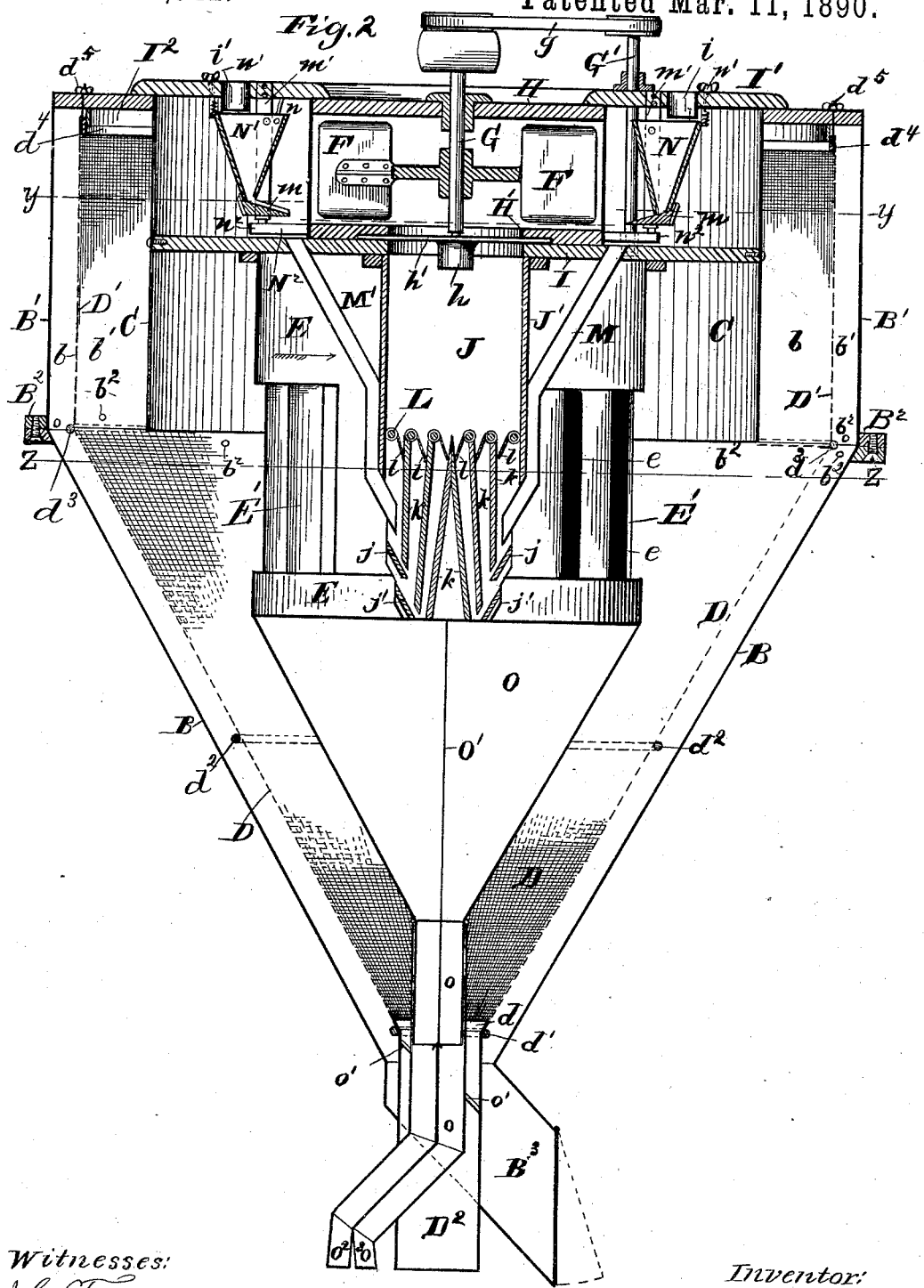
Figure 3:
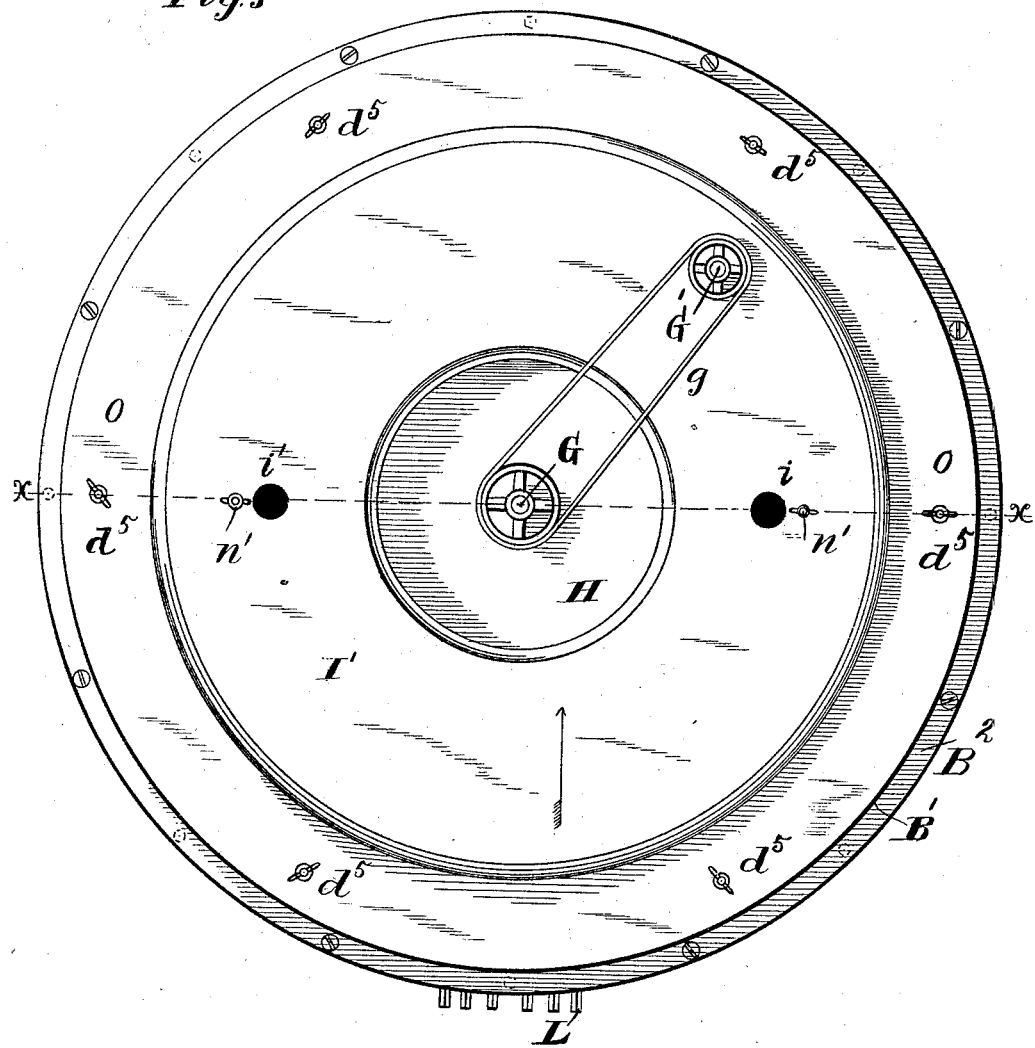
Figure 4:
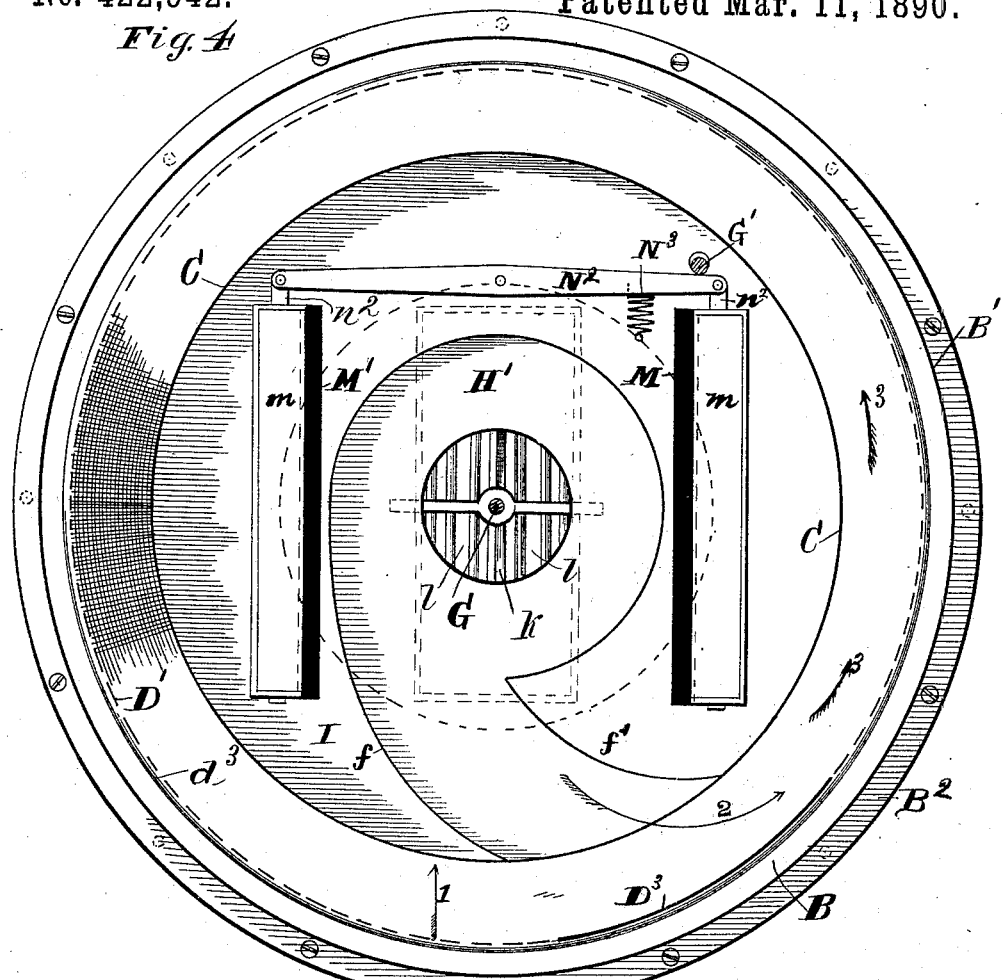
Figure 7:
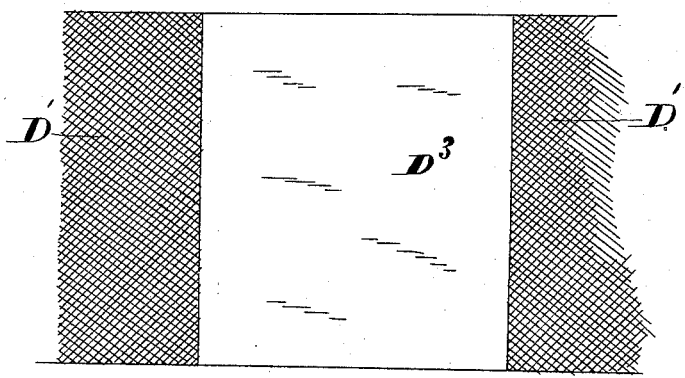

Be it known that I, NOAH WILLIAM HOLT, a citizen of the United States, residing at Manchester, in the county of Washtenaw and State of Michigan, have invented certain new and useful Improvements in Separating-Machines, of which the following is a specification, reference being had therein to the accompanying drawings.
Figure 1 is a side elevation. Fig. 2 is a vertical section on line $xx$, Fig. 3. Fig. 3 is a top or plan view. Fig. 4 is a section on line $yy$, Fig. 2. Fig. 5 is a section on line $zz$, Fig. 2. Fig. 6 is a detached view of the side of the aspirator-casing and one of the feed-spouts, looking in the direction of the arrow on Fig. 2. Fig. 7 is a detached partial view in elevation.

I have in an earlier filed application of mine, Serial No. 271,134, shown and described many features of construction which are common to this case also, but do not wish to claim herein any of the inventions which may be properly made the subject-matter of that earlier case.

Referring to the drawings, B B' is an inclosing shell or casing, of which the lower part B is funnel shaped, the upper part B' being preferably circular in cross-section and of uniform diameter throughout.

C is a guard, preferably circular in cross-section and of uniform diameter throughout, but of less diameter than the shell B and arranged concentric therewith.

D D' is a bolting-cloth, preferably corresponding in form to the outer shell or casing, but somewhat smaller and arranged concentric therewith, whereby there are formed two annular chambers $b\ b'$. While I prefer to make these parts thus far described of about the relative sizes indicated in the drawings, yet I do not wish to be limited thereto. A portion $D^3$ of the cylinder-shaped section D', opposite to the mouth of the fan-case, is made of some practically imperforate material—such as canvas, leather, or some closely-woven fabric—for the purpose which will be explained.

I prefer to make the parts B B' in separate pieces secured to each other by flanges $B^2\ B^2$, to which the adjacent edges of the shells are attached by screws or pins $b^2$, (see Fig. 2,) in which the bolting-cloth is shown broken away. Of course I propose to use silk or wire-cloth of any suitable-sized mesh, according to the character of the material to be treated. A convenient plan for supporting this cloth is shown in Fig. 2, in which $D^2$ is a short tube-section flanged or flaring, as at $d$, at its upper end.

$d'\ d^2\ d^3\ d^4$ are hoops or rings applied to the cloth and attached thereto in any convenient way—as, for instance, by strips of cloth or tape sewed to the outer surface of the cloth, so as to form pockets for the reception of the rings. The lower ring $d'$ fits closely the outer face of the tube $D^2$, and is supported against upward pull by the flaring or flanged end $d$ of the tube $D^2$, which in turn is supported against upward pull, preferably by being connected by ties $o'\ o'$ with a discharge tube or spout, to be hereinafter described. The ring $d^4$ is preferably made of flat iron, and is connected with the top of the machine by means of adjusting-screws or draw-rods $d^5$. (See Figs. 1 and 2.) Thus the cloth may be stretched lengthwise between its lower stationary support and its upper movable support to any desired tension, the intermediate rings $d^2\ d^3$ assisting in supporting the cloth in proper shape against either inward or outward deflection.

I prefer to apply tension to the upper end of the cloth rather than the lower end, because, first, of the greater convenience in applying the tension devices, and, secondly, because holding the cloth snugly against the flanged upper end of the tube-section $D^2$ facilitates material sliding over the cloth and out through the tube; but I do not wish to be limited to any particular devices for tightening the cloth.

E is a shell of an air-chamber, circular in cross-section and connected at its upper end to the casing of the fan F, or to a horizontal partition when the fan is made separate and apart from the remainder of the machine and inserted therein, as is indicated in Fig. 2. The shell is provided with air-inlets $ee$, formed, preferably, by cutting three sides of the flanges or lips E' E' and bending them inward with their cut ends or edges facing direction of travel of the air-currents, the movement of which is indicated by the arrows 3 in Fig. 4, for a purpose to be explained. These curvilinear or scroll-shaped wings or flanges might be made of separate parts—say of sheet metal—each secured by one edge to the shell E; but I prefer the construction shown. In either case, however, it is best to have the shell substantially circular in cross-section.

G is the fan-shaft, having its lower end in a step $h$, the arms of which are mounted on the lower fan-head H', or on a partition I when such partition takes the place of the fan-head, and the deck or top of the machine I' may serve as the upper head of the fan-case, although I prefer to employ a fan having separate heads with the shell fastened thereto, as indicated in Fig. 2. In either case I propose to use a downwardly-projecting ring or flange $I^2$ in close proximity to the upper edge of the bolting-cloth to prevent the escape of dust or other material at that point. The part $f'$ of the shell of the fan may be in one and the same piece with the part $f$, the fan discharging air through its mouth into the chamber $b$ in the direction indicated by the arrow 2, Fig. 4, whereby the air discharged by the fan, together with the material carried through the fan with the air-current, is caused to rotate within the bolting-chamber and deliver material to be separated against the bolting-cloth by centrifugal action.

By an examination of Figs. 2 and 4 it will be readily understood that the guard C performs a twofold function, first, in connection with the fan-case, the deck of the machine, and the partition I, it forms an inclosed chamber of such character that it is not liable to be traversed by air-currents. In such chamber I propose to locate the feeders which deliver material to the machine. Again, this guard assists in controlling and determining the direction of movement of the air-currents and insures that they and the material carried by them or with them shall rotate within the separating-chamber and shall be properly directed downward into the funnel-shaped part of said chamber.

Within the air-chamber E, I arrange an aspirator, preferably square or rectangular in horizontal section, as shown in Figs. 2 and 5, and of which the end pieces J of the casing extend some distance below the side pieces or walls J' and serve as supports for a series of inclined boards $j j'$ and some nearly vertically-arranged boards $k k$, whereby there is formed between these boards and between these boards and the walls of the aspirator a series of throats, through which air-currents are drawn upward into and through the fan-case, with the lower eye of which the casing of the aspirator communicates, the space between the upper ends of the boards $k k$ and the lower eye of the fan-case constituting an exhaust-chamber, which is common to all the throats of the double aspirator, and is arranged about centrally within the air-chamber.

L L are a series of rocking bars, mounted in the end walls J J and carrying valves or dampers $l l$, so that the strength of the air-currents through each of the throats can be independently regulated.

To facilitate controlling the air-currents, I propose to extend the ends of the rocking bars through the casings, as indicated in Figs. 3 and 4, and square their ends, so that they can be turned by a wrench, making them fit so closely within the seats in which they are mounted that they will be held by friction after they have been adjusted.

M M' are feed-spouts, each being about as wide as is the adjacent side of the aspirator-chamber. The lower end of each spout passes through or below the adjacent side of the aspirator-chamber a short distance above the upper edge of one of the inclined boards $j$.

N N' are feed-hoppers, each supported at or near the rear side by pivot-links $n n$—one at each end of the hopper—the opposite side of the hopper being suspended from the deck by means of adjustable spring-links $n' n'$—one at each end of the hopper N'.

$m m$ are shaking-shoes suspended at short distances below the hoppers by links $m' m'$, preferably elastic links.

$N^2$ is a pivoted lever connected at its ends to the shaking-shoes by links $n^2$. This lever is vibrated by cam-shaft G', driven from the fan-shaft by belt $g$ and a returning-spring $N^3$.

The lower part of the air-chamber is preferably made in the form of a hopper O, with a discharge-spout $o$. Thus this hopper serves the double purpose of preventing air from entering the bottom of the air-chamber and of collecting material which falls through the aspirator and delivering it to a spout passing out of the machine. It also serves to increase the rotary movement of the material around the lower part of the bolting-chamber by reducing the superficial area of the space between the bottom of the air-chamber and the adjacent bolting-cloth.

The hopper and spout are divided by a central partition O' into two sections, of which one receives material which enters the machine through spout M, and falls thence through the aspirating-throats below said spout and out at $o^3$, while the material which goes through spout M' and the aspirating-throats on that side of the machine falls on the opposite side of partition O' and out at $o^2$.

From the above description it will be readily seen that material fed in through an opening $i$ falls thence through the hopper and the shaking-shoe $m$, which will deliver it in a shallow stream about the width of the spout M, through which it will be delivered to that side of the aspirating-chamber, where it will be acted upon by upward moving air-currents put in motion by the fan. Thus the material is fed in at the upper part of the machine through two separate and independent hoppers arranged upon opposite sides of the fan and in dead-air chambers, is conducted thence in shallow streams in closed conduits through an air-chamber surrounding the aspirator, and is delivered to the outer throats upon opposite sides of the aspirator, whence it passes successively to the next innermost throats of the series.

The presence of the air-chamber within the shell E insures a more uniform and better distribution of the air across the entire width of the throats of the aspirator than would otherwise be attained, and the arrangement of the exhaust-chamber immediately below and connected with the eye of the fan is specially advantageous in the treatment of material such as middlings or the coarser chop, where it is desirable to avoid as far as possible disintegration of the granules, because, among other things, with a fan of this sort, the mouth of which opens tangentially into the separating-chamber, the air within the fan-case and the upper part of the exhaust-chamber has imparted to it a whirling motion, so that the blades do not break up the flour-producing part of the berry or wheat as much as they would if this whirling motion were not produced. These upward-moving air-currents will take out more or less of the lighter particles of material and discharge them against the cloth, through which parts of such material will be sifted as it travels around between the shell C and the adjacent cloth, that material being forced outward by centrifugal action. Such portions of the material as slide over the funnel-shaped section of the cloth will be sifted through its meshes (when fine enough) partly by centrifugal action and partly by gravity. Such material as passes through the cloth will be collected in the annular space between the cloth and the shell B B' and discharged through the spout $B^3$ at its lower end. Such material as does not go through the cloth will be separated from the air by centrifugal action and gravity and discharged through the spout $D^2$. Such material as passes down through and out of the throats of the aspirator will be discharged through the spout $o^2$.

Of course material fed in through the opening $i'$ on the opposite side of the machine and through the hopper N' will be subjected to similar operations, except that the material which passes down through that side of the aspirator will be discharged at $o^2$, while the material taken out by the air-currents will be mingled in chamber $b$ with the material taken out by the air-currents from the opposite side of the aspirator, and will be similarly graded by the cloth.

Thus the machine is well adapted to perform substantially the function of two scalping-reels having different numbers of cloth in scalping out the middlings from different breaks in operating a mill according to the system of gradual reduction as generally practiced, because the strength of the air-currents may be regulated to operate suitably upon the breaks according to their coarseness of granulation, while the bolting-cloth may be of such mesh as will prevent the passage through it of middlings, while permitting the passage of the fine flour and pulverulent impurities.

The function of the substantially-imperforate section of cloth $D^3$ is to prevent material being driven through the cloth-section by the direct impact produced by the material being driven against the cloth as it leaves the mouth of the fan, it being readily understood that such impact operates very differently from the sliding movement of the material over the cloth as it travels around the other portion of the chamber $b$.

Although in ordinarily operating my machine I propose to employ the bolting-cloth, yet it is obvious that many parts of this invention are adapted for use in connection with other forms of separating-chamber.

The object in making the openings $e$ $e$ through the shell with the scroll-shaped wings or flanges is to facilitate supplying the aspirator with pure air, it being apparent that the air which is necessary for such purpose can be drawn from the remainder of the whirling body of air without carrying with it dust-particles or particles of middlings, because of the change in direction which is necessary in order to have the air drawn through the openings $e$ $e$, as indicated by the arrows 4 on Fig. 5. Thus these flanges or lips E' serve as guides to direct the greater part of the rotating air-current which comes in contact with them around the interior of the separating-chamber, while permitting a part of such air to be drawn inward and downward, so as to enter the throats of the aspirator without being disturbed by the movement of the rotating body of air which is outside of the air-chamber, it being protected against such disturbance by not only the cylindrical part of the air-chamber, but also by its funnel-shaped lower section. So, also, this machine may be advantageously used alternately as a single machine having the same grade of material fed through both of them and subjected to substantially the same strength of air-currents through all the throats of the aspirator, and as a double machine having different grades of material fed through the opposite hoppers and subjected to different strengths of air-currents in the purification of middlings, it being well known that as flouring-mills are now operated quite radical changes in the grading and subsequent treatment for purification of middlings are required according to the varying conditions and kinds of grain being reduced to flour; hence it is desirable to have a separator which may be used, in the manner above indicated, in combination with spouting and valves or switches, which facilitate such handling of material in order to do the work thoroughly and economically.

This machine is provided with separate and independent feeders adapted to receive and deliver to the double aspirator material of quite different grades from the different reductions produced in roller-mills of the ordinary construction and without the intervention of any such grading device (for instance, a shaker) as has been commonly used with double aspirators, thereby avoiding the injurious wear which results from the action of a grader of the sort indicated. Again, the combination, with such double aspirator, of a divided hopper, the hopper being provided with outlets which are adjacent to each other, facilitates the alternate use of the machine, it being obvious that such construction and arrangement enable the operator to discharge the entire mass which passes through the double aspirator through a single common spout or through two separate spouts as its character may render desirable without the wear which would be necessarily incident in a machine where the material from the two aspirators is delivered at or near the opposite ends of the casing.

A machine of this character has marked advantages over what is known as "double machine purifier" clothed with cloths of different mesh, from the fact that in my machine there are no cloths requiring to be changed in order to adapt it for operation upon the different grades of material, as is the case in double machine purifiers, which are constructed with removable and interchangeable cloth-frames to accomplish substantially the same purpose.

I am aware that an air-current has been employed to assist in the operation of bolting by passing the current through the cloth with the material sifted, thence through the chamber surrounding the bolting-chamber, and thence through a fan and back again to the interior of the bolting-chamber; but the principle and mode of operation in my machine are radically different from that of those heretofore used, in that, among other things, the space between the cloth and the outer casing constitutes practically a dead-air chamber, so that there is no appreciable air-current through the cloth, the principal function of the air being twofold, first, to effect a separation of material within the aspirating-chamber, and, secondly, to impart to the material which it has taken out from the aspirating-chamber a rotary or whirling motion inside of the bolting-chamber. By this latter operation two results are attained, to wit, material is sifted through the cloth into the dead-air chamber and other material is, by the action of the vortex within the bolting-chamber, separated from the whirling body of air and discharged through the divided hopper O and the air-spouts at the bottom of the hopper. Thus the space within the bolting-cloth also serves as a vortex-chamber, and the space between the shell E and the aspirator serves as an air-chamber, in which the air coming in through the openings E in a direction practically the reverse of that which the material separated therefrom by the vortex has time and space in which to become so diffused that the desired uniformity of strength throughout the entire width of each of the throats of the aspirator can be attained.

I am aware that separating-machines have heretofore been constructed with funnel-shaped outer casings and an inner bolting-surface, also funnel shaped, in combination with revolving blades traveling in close proximity to the cloth, and that similarly-arranged shells and bolting-surfaces have been used in connection with revolving feeders; but it is evident that my machine operates different from either of those above referred to, because, among other things, a rotating air-current which carries material round and round the machine in contact with the bolting-cloth will separate the material with far less disintegration of it than results from imparting a rotary motion by means of revolving mechanical devices of the character heretofore used. Again, none of the earlier machines above referred to contained any appliances for effecting a preliminary separation by taking out, in an aspirator or otherwise, material which is adapted to be sifted through the bolting-surface and permitting the coarser heavier particles to go out of the machine without coming into contact with the cloth, such preliminary bolting or separation being advantageous, because it not only saves overloading the cloth, but also prevents a great deal of the abrading or disintegrating of flour-producing parts of the grain by subjecting it to the attrition of the coarser particles while in rapid movement over the inner surface of the bolting-cloth, which accompanies the use of mechanical appliances.

What I claim is—

1. In a separating-machine, the combination of an outer casing, a bolting-cloth within the casing, an aspirating-chamber within the bolting-cloth, and means whereby an air-current is moved through the aspirating-chamber and is caused to rotate in the space inclosed between the bolting-cloth and the aspirator, substantially as set forth.

2. In a separating-machine, the combination of an outer casing, a bolting-cloth within the casing, an aspirating-chamber within the bolting-cloth, and a fan above the aspirating-chamber and communicating directly therewith and arranged to discharge material taken out of the aspirating-chamber directly into the separating-chamber, substantially as set forth.

3. In a separating-machine, the combination of an outer casing, a bolting-cloth within the casing, an aspirating-chamber within the bolting-cloth, a fan above the aspirating-chamber and within the outer casing, the upper end of the aspirating-chamber being connected directly to the lower eye of the fan-casing, the mouth of the fan opening directly into the bolting-chamber and being inclined in the direction in which the air-current and material to be bolted rotate, substantially as set forth.

4. In a separating-machine, the combination of an outer casing, a bolting-cloth within the casing, an aspirating-chamber within the bolting-cloth, an air-chamber between the bolting-cloth and the aspirating-chamber, and means whereby an air-current is moved through the aspirating-chamber and is caused to rotate in the space between the bolting-cloth and the air-chamber, substantially as set forth.

5. In a separating-machine, the combination of an outer casing, a bolting-cloth within the casing, an aspirating-chamber within the bolting-cloth, and a guard interposed between the upper part of the aspirating-chamber and the bolting-cloth, whereby there is formed an annular space between the guard and the upper part of the bolting-cloth, substantially as set forth.

6. In a separating-machine, the combination of a separating-chamber, an aspirating-chamber within the separating-chamber, an air-chamber between the aspirating-chamber and the inclosing-wall of the separating-chamber, and means whereby an air-current is moved through the aspirating-chamber and is caused to rotate in the space between the air-chamber and the inclosing-wall of the separating-chamber, substantially as set forth.

7. In a separating-machine, the combination of a separating-chamber, an aspirating chamber within the separating-chamber, an air-chamber between the aspirating-chamber and the inclosing-wall of the separating-chamber, the air-chamber being provided with openings in its side, and a guard surrounding the air-chamber, with its lower edge projecting below the upper parts of the air-chamber, and means whereby an air-current is moved through the aspirating-chamber and is caused to rotate in the space between the air-chamber and the inclosing-wall of the separating-chamber, substantially as set forth.

8. In a separating-machine, the combination of a separating-chamber, an aspirating-chamber within the separating-chamber, an inclosed feeder-chamber arranged within the casing of the machine, and means whereby an air-current is moved through the aspirating-chamber and is caused to rotate in the space around the aspirating-chamber, substantially as set forth.

9. In a separating-machine, the combination of a separating-chamber, an aspirating-chamber within the separating-chamber, a fan within the separating-chamber, a guard between the fan and the inclosing-wall of the separating-chamber, a partition across the guard below the blades of the fan, and a feeder arranged in the chamber formed between the partition, the guard, and the top of the machine, substantially as set forth.

10. In a separating-machine, the combination of a separating-chamber, means whereby an air-current is caused to rotate within the separating-chamber, an aspirating-chamber within the separating-chamber, a guard of greater diameter than the aspirating-chamber, arranged within the inclosing-wall of the separating-chamber, and an air-chamber within the guard and provided with openings in its side, and guides adjacent to the air-openings, adapted to direct air around the separating-chamber, substantially as set forth.

11. In a separating-machine, the combination, with a separating-chamber, of means whereby an air-current is caused to rotate within the separating-chamber, an aspirating-chamber within the separating-chamber, an air-chamber surrounding the aspirating-chamber and provided with openings in its side, and guides adjacent to the air-openings and inclined inward and in a direction the reverse of that in which the air rotates, substantially as set forth.

12. In a separating-machine, the combination of a separating-chamber, an aspirating-chamber within the separating-chamber, means whereby an air-current is caused to rotate in the space between the aspirating-chamber and the inclosing-wall of the separating-chamber, an air-chamber surrounding the aspirating-chamber and provided with openings in its side for the passage of air, and with a hopper-bottom to collect material which has fallen through the aspirator, substantially as set forth.

13. In a separating-machine, the combination of an outer casing, means whereby an air-current is caused to rotate between the outer casing and the aspirating-chamber, an aspirating-chamber within the casing, an air-chamber between the wall of the aspirating-chamber and the outer casing, the air-chamber having openings in its side for the admission of air, and a hopper-bottom to collect material which falls through the aspirating-chamber, substantially as set forth.

14. In a separating-machine, the combination of an outer casing, an aspirating-chamber within the casing, an air-chamber between the wall of the aspirating-chamber and the outer casing, the guard between the air-chamber and the outer casing to assist in determining the movement of the air-currents, and means whereby an air-current is caused to rotate in the space between the guard and the outer casing, substantially as set forth.

15. In a separating-machine, the combination of an outer casing, an aspirating-chamber within the casing, an air-chamber between the wall of the aspirating-chamber and the outer casing, the guard between the air-chamber and the outer casing, the air-chamber having openings in its side for the admission of air, and a hopper-bottom connected at its upper end to the bottom of the air-chamber, substantially as set forth.

16. In a separating-machine, the combination of a separating-chamber, an aspirator arranged within the separating-chamber and having a series of throats arranged upon opposite sides, an exhaust-chamber above the throats and common to the series, a divided hopper below the series of throats, and means whereby an air-current is moved through the throats in an upward direction and is caused to rotate in the separating-chamber, substantially as set forth.

17. In a separating-machine, the combination of a separating-chamber, an aspirator arranged within the separating-chamber and having two series of throats arranged upon opposite sides, an air-chamber arranged within the separating-chamber and outside of the aspirator and provided with openings in its sides for the admission of air, and also provided with a funnel-shaped lower part, and means whereby an air-current is moved through the aspirator and around the air-chamber, substantially as set forth.

18. In a separating-machine, the combination of a separating-chamber, an aspirating-chamber within the separating-chamber, a fan arranged in the upper part of the machine, a feeder-chamber by the side of the fan, a feeder arranged within the feeder-chamber and adapted to deliver material in a shallow stream about the width of the aspirating-chamber, and a feed-spout connected at its upper end to the feeder-chamber, passing thence through the separating-chamber and communicating at its lower end with the aspirating-chamber, substantially as set forth.

19. In a separating-machine, the combination of a separating-chamber, an aspirating-chamber within the separating-chamber, a feeder-chamber in the upper part of the machine, two feeders in the feeder-chamber, two separate outlets below the aspirating-chamber, adapted to receive and conduct out of the machine different grades of material from the aspirating-chamber, and means whereby an air-current is moved through the different grades of material fed in through the two feeders and is caused to rotate in the separating-chamber, substantially as set forth.

20. In a separating-machine, the combination of a separating-chamber, an aspirating-chamber arranged within the separating-chamber and provided with two series of throats upon opposite sides of said aspirating-chamber, a fan above the aspirating-chamber, two feeders adapted to receive materials of different grades and deliver them to the two series of throats, and means connected with the shaft of the fan for operating the feeders, substantially as set forth.

21. In a separating-machine, the combination of a separating-chamber having an outer casing and an inner bolting-cloth, an aspirating-chamber within the bolting-cloth, a discharge-spout at the lower end of the outer casing, an inner discharge-spout connected with and supporting the lower end of the bolting-cloth, and an inner discharge-spout connected with the aspirator, substantially as set forth.

In testimony whereof I affix my signature in presence of two witnesses.

NOAH WILLIAM HOLT.

Witnesses:
H. H. DOUBLEDAY,
J. C. TURNER.